US010030583B2

(12) United States Patent
Burd

(10) Patent No.: US 10,030,583 B2
(45) Date of Patent: Jul. 24, 2018

(54) DISTRIBUTED SPARK IGNITER FOR A COMBUSTOR

(71) Applicant: UNITED TECHNOLOGIES CORPORATION, Farmington, CT (US)

(72) Inventor: Steven W. Burd, Cheshire, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 363 days.

(21) Appl. No.: 14/759,774

(22) PCT Filed: Nov. 6, 2013

(86) PCT No.: PCT/US2013/068700
§ 371 (c)(1),
(2) Date: Jul. 8, 2015

(87) PCT Pub. No.: WO2014/130102
PCT Pub. Date: Aug. 28, 2014

(65) Prior Publication Data
US 2015/0354460 A1 Dec. 10, 2015

Related U.S. Application Data

(60) Provisional application No. 61/767,518, filed on Feb. 21, 2013.

(51) Int. Cl.
F02C 7/266 (2006.01)
F23R 3/00 (2006.01)
F23C 99/00 (2006.01)

(52) U.S. Cl.
CPC ............ F02C 7/266 (2013.01); F23C 99/001 (2013.01); F23R 3/002 (2013.01); F23N 2027/36 (2013.01); F23R 2900/00009 (2013.01)

(58) Field of Classification Search
CPC .............. F02C 7/264; F02C 7/266; F23R 2900/00009; F23R 3/002; F23R 3/00;
(Continued)

(56) References Cited

U.S. PATENT DOCUMENTS 2,590,778 A * 3/1952 Lautenberger ........ F02P 15/003
123/638
2,701,324 A * 2/1955 Peroutky .................. C25D 3/24
123/169 R (Continued)

FOREIGN PATENT DOCUMENTS

EP 1225392 A2 7/2002
GB 1483346 A 8/1977

OTHER PUBLICATIONS

European Search Report, European Application No. 13875496.5, dated Oct. 7, 2016, European Patent Office; European Search Report 7 pages.

(Continued)

Primary Examiner — Gerald L Sung
Assistant Examiner — William Breazeal
(74) Attorney, Agent, or Firm — Cantor Colburn LLP

(57) ABSTRACT

An ignition system for a combustor of a gas turbine engine is disclosed. The ignition system may include an igniter operatively associated with the combustor, and an electrode operatively associated with the combustor and spaced from the igniter, wherein an electrical potential is created between the igniter and the electrode to produce an electric arc therebetween.

20 Claims, 4 Drawing Sheets

(58) Field of Classification Search
CPC ..... F23N 2027/36; H01T 13/50; H01T 13/52; H01T 13/54; F23C 99/001
See application file for complete search history.

(56) References Cited

U.S. PATENT DOCUMENTS

| | | | |
|---|---|---|---|
| 3,110,294 A | | 11/1963 | Gosta |
| 4,525,140 A | * | 6/1985 | Larigaldie ............... F02P 15/08 123/169 EL |
| 4,947,641 A | * | 8/1990 | Rodgers ................... F02C 3/14 60/39.76 |
| 5,833,244 A | * | 11/1998 | Salt ...................... F01D 11/001 277/418 |
| 2006/0000260 A1 | | 1/2006 | Benson et al. |
| 2006/0175306 A1 | | 8/2006 | Prociw |
| 2008/0056961 A1 | | 3/2008 | Matveev |
| 2009/0165436 A1 | | 7/2009 | Herbon et al. |
| 2011/0250098 A1 | | 10/2011 | Matveev |
| 2012/0110975 A1 | | 5/2012 | Alholm |
| 2012/0125007 A1 | | 5/2012 | Steffler |

OTHER PUBLICATIONS

International Search Report Application No. PCT/US2013/068700 reported on Feb. 12, 2014.

* cited by examiner

DISTRIBUTED SPARK IGNITER FOR A COMBUSTOR

CROSS-REFERENCE TO RELATED APPLICATIONS

This application is a 35 U.S.C. § 371 National Phase filing of International Patent Application No. PCT/US13/68700 filed on Nov. 6, 2013, and claims priority under 35 U.S.C. § 119(e) to U.S. Provisional Application Ser. No. 61/767,518 filed on Feb. 21, 2013.

FIELD OF THE DISCLOSURE

The present disclosure generally relates to gas turbine engines and, more specifically, to igniters for a combustor of a gas turbine engine.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and compressor section, having a low and high pressure compressor and a plurality of blades, rotate to draw in and compress the ambient air. The compressed air is then forced into the combustor, where it is split. A portion of the air is used to cool the combustor while the rest is mixed with a fuel and ignited.

Typically, an igniter generates an electrical spark to ignite the air-fuel mixture. The products of the combustion then travel out of the combustor as exhaust and through a turbine section. The turbine section, having a high and low pressure turbine and a plurality of blades extending from each turbine, is forced to rotate as the exhaust passes through the turbine blades. The turbine section, fan, and compressor section are connected by concentrically mounted engine shafts running through the center of the engine. Thus, as the turbines rotate from the exhaust, the fan and corresponding compressor rotate to bring in and compress new air. Once started, it can thereby be seen that this process is self-sustaining.

Combustors for gas turbine engines typically have a shell and a liner with an air passage between the shell and the liner of the combustor. In an annular combustor, an outer liner and an inner liner cooperate to define, and are separated by, an annular combustion chamber. The outer liner is positioned radially inside the outer shell and the inner liner is positioned radially outside of the inner shell. In such a combustor, there is at least one igniter for igniting the air-fuel mixture. In some combustor designs, the liners may be segmented into panels.

The combustor further has a combustor bulkhead at a forward end of the combustor generally extending radially from the outer shell to the inner shell. At least one fuel injector extends through this bulkhead and into the combustion chamber to release the fuel. A swirler is generally positioned around each fuel injector to admit combustion air and create turbulence in said combustion air to mix the combustion air and the fuel before the mixture is combusted.

In prior art designs, a capacitor discharge ignition system is typically used to ignite the air-fuel mixture in the combustion chamber. Such igniters create a local spark kernel or plasma cloud to introduce highly-concentrated energy into the combustion chamber for the ignition process and to sustain combustion. However, this requires that the design and aerodynamics provide the proper air-fuel stoichiometry near the kernel to permit ignition or to prevent blowout, which is difficult given how the fuel and air are introduced into the combustion chamber. The region around the igniter may exhibit recirculation, large fuel and air gradients, and turbulence that all negatively impact operation of the prior art igniters. Additionally, the spark kernel has limited range and a limited life span in the combustion chamber. Therefore, an igniter that overcomes these difficulties is needed.

SUMMARY OF THE DISCLOSURE

In accordance with one aspect of the disclosure, an ignition system for a combustor is disclosed. The ignition system may include an igniter operatively associated with the combustor, and an electrode operatively associated with the combustor and spaced from the igniter, wherein an electrical potential is created between the igniter and the electrode to produce an electric arc therebetween.

In a refinement, the combustor may include a combustion chamber and the igniter includes a terminal which projects into the combustion chamber.

In another refinement, the igniter includes a housing and a terminal, wherein the terminal may be recessed into the housing.

In yet another refinement, the housing may be made of electrically insulating material.

In still another refinement, the igniter and electrode may be substantially diametrically opposed around the combustor.

In another refinement, the combustor includes a shell, and the electrode is a discrete element separate from, and mounted to, the shell.

In another refinement, the combustor includes a shell and the shell serves as the electrode.

In accordance with another aspect of the disclosure, a gas turbine engine is disclosed. The engine may include a compressor, a combustor downstream from the compressor, and a turbine downstream from the combustor and connected to the compressor by an engine shaft. The engine may further include an ignition system having an igniter operatively associated with the combustor, and an electrode operatively associated with the combustor and being spaced from the igniter, wherein an electrical potential is created between the igniter and the electrode to produce an electric arc therebetween.

In a refinement, the combustor includes an inner shell, an outer shell, and a bulkhead defining a combustion chamber, and the igniter includes a terminal which projects into the combustion chamber.

In a refinement, the igniter includes a housing and a terminal, wherein the terminal is recessed into the housing.

In another refinement, the housing is made of electrically insulative material.

In another refinement, the igniter and the electrode are substantially diametrically opposed around the combustor.

In another refinement, the combustor includes a shell, and the electrode is a discrete element separate from, and mounted to, the shell.

In another refinement, the combustor includes a shell, and the shell serves as the electrode.

In yet another refinement, the electrode may be charged.

In still another refinement, the electrode may be a non-charged electrically conductive rod.

In accordance with yet another aspect of the present disclosure, a method of igniting a fuel and air mixture within a combustor is disclosed. The method may include combining a fuel with air in the combustor, creating an electrical potential between an igniter and an electrode spaced apart from each other in the combustor and thereby producing an electric arc between the igniter and the electrode, and igniting the air and fuel mixture with the electrical arc.

In another refinement, the creating of the electrical arc may involve creating a pulsed electrical arc between the igniter and the electrode.

In a further refinement, the creating of the pulsed electrical arc may involve creating a constant frequency-pulsed electrical arc.

In yet another refinement, the creating of the electrical arc may involve creating a non-constant, frequency-pulsed electrical arc.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
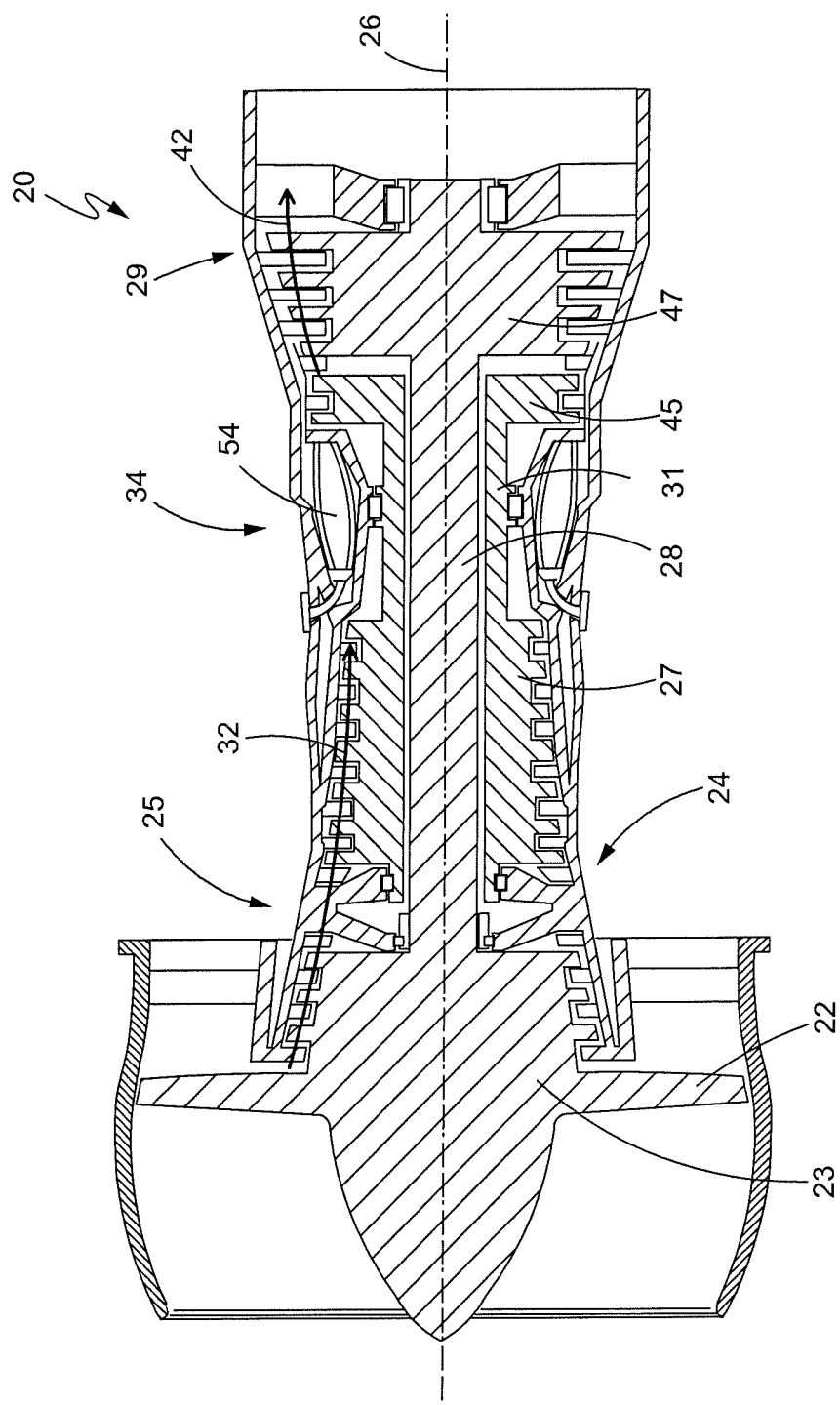
FIG. 1 is a cross-sectional view of a gas turbine engine built in accordance with an embodiment of the present disclosure.

Referring now to the drawings, and with specific reference to FIG. 1, a gas turbine engine, depicted as a turbofan engine, is generally referred to by numeral 20. The engine 20 includes a plurality of axially aligned components beginning with a fan 22 and a compressor section 24. The fan 22 is positioned at a forward end 25 of the engine 20 and draws in ambient air by rotating around a central axis 26 on a first engine shaft 28, which extends from the forward end 25 to an aft end 29 of the engine 20 along the central axis 26. The compressor section 24 is positioned downstream from the fan 22 and is depicted as a dual-spool compressor having a low-pressure compressor 23 and a high-pressure compressor 27; however, other compressors are possible. The low-pressure compressor 23 compresses the ambient air by rotating on the engine shaft 28 around the central axis 26 to create compressed air 32. The compressed air 32 is further compressed by the high-pressure compressor 27 which rotates on a second engine shaft 31 concentrically mounted around the first engine shaft 28.

Figure 2:
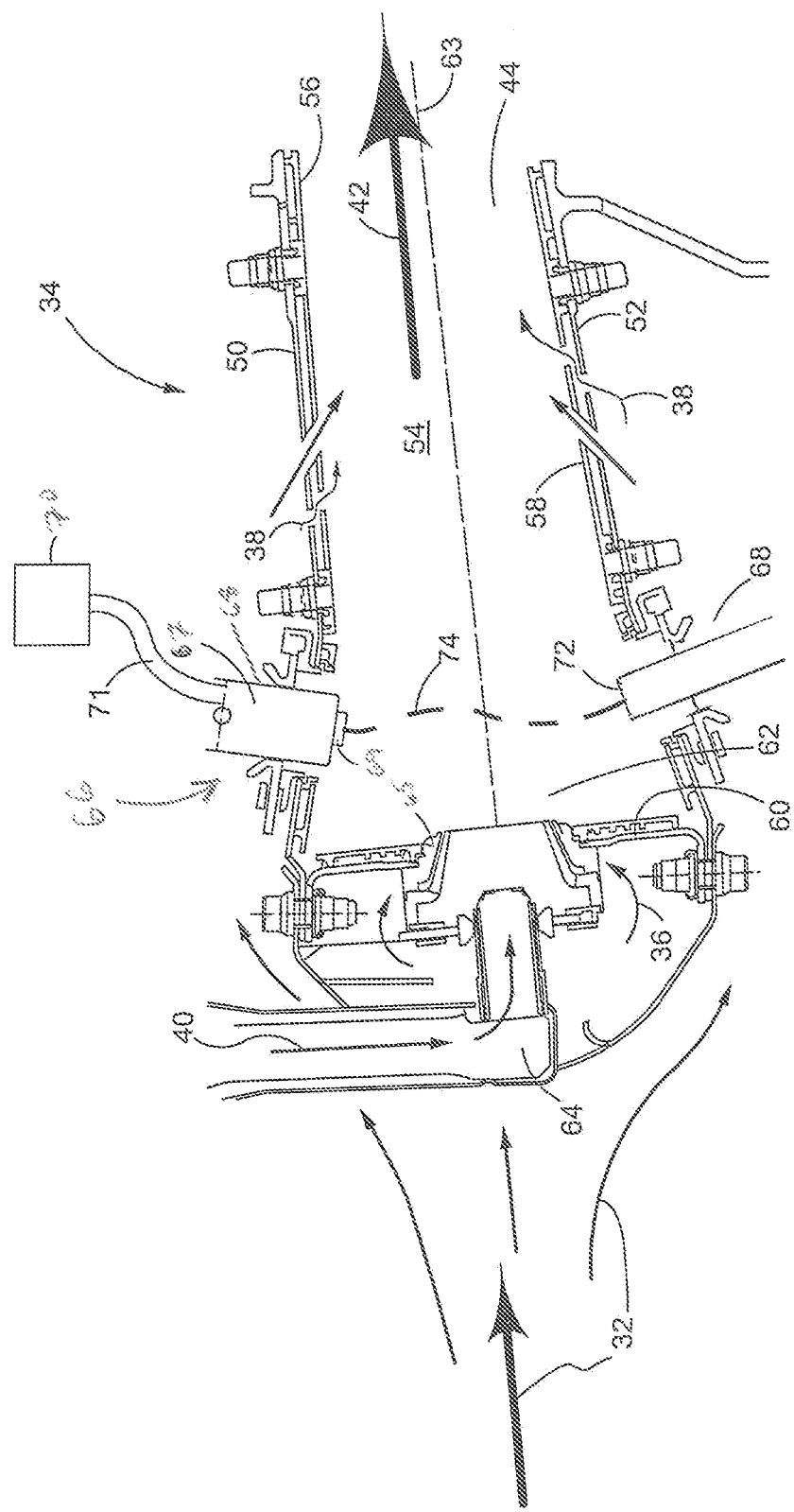
FIG. 2 is a longitudinal cross-sectional view of an annular combustor built in accordance with an embodiment of the present disclosure and detailing a secondary spark terminal.

As shown in FIG. 2, the compressed air 32 then flows from the compressor section 24 to a combustor 34 where the air 32 is split to be used as combustion air 36 and cooling air 38. Burning the combustion air 36 with a fuel 40 in the combustor 34 creates an exhaust 42, which exits the combustor 34 at an aft end 44 of the combustor 34 and expands into the turbine section 46 downwind of the combustor 34, depicted as a dual-spool turbine in FIG. 1 having a high-pressure turbine 45 and a low-pressure turbine 47. The expanding exhaust 42 causes the high-pressure turbine 45 to rotate on the second engine shaft 31 around the central axis 26, which drives the rotation of the high-pressure compressor 27. The exhaust 42 continues to expand into the low-pressure turbine 47 which rotates on the first engine shaft 28 causing the fan 22 and low-pressure compressor 23 to rotate. Thus, new air is drawn into the engine 20 and compressed as the exhaust 42 exits the engine 20. While the embodiment depicted in FIG. 1 is of a dual-spool gas turbine engine, this is only one embodiment, and any gas turbine engine is possible having any spool configuration such as, but not limited to, single or triple spool.

The combustor 34 may be annular in shape, as shown in FIG. 2, and positioned around the central axis 26. In addition, although "combustor" as used herein in connection with accompanying drawings is shown as a structure within a gas turbine engine, used to ignite an air and fuel mixture, it is to be understood that "combustor" also encompasses other combustion devices such as, but not limited to, burners, augmenters, combustors with igniter systems, and the like. The annular combustor 34 may have an outer shell 50 and an inner shell 52 radially inward of the outer shell 50. Additionally, an outer liner 56 may be positioned radially inward of the outer shell 50, and an inner liner 58 may be positioned radially outward of the inner shell 52. The liners 56 and 58 may cooperate to define a combustion chamber 54 therebetween and act as a thermal barrier to protect the shells 50 and 52, respectively, from the high temperatures in the combustion chamber 54. A bulkhead 60 may be of an annular shape and extend from the inner shell 52 to the outer shell 50 to define a forward end 62 of the combustion chamber 54. The combustion chamber 54 has a centerline 63 between the inner and outer shells 56, 58 extending the length of the combustion chamber 54 from the forward end 62 to the aft end 44. In some embodiments, the liners 56 and 58 may include a plurality of panels.

At least one fuel injector 64 extends through the bulkhead 60 for flowing fuel 40 and dispersing that fuel 40 into the combustion chamber 54 to be mixed and burnt with the combustion air 36. A swirler assembly 66 may be positioned around each fuel injector 64 to allow combustion air 36 to enter into the combustion chamber 54 and to mix with the fuel 40. While the pictured combustor 34 includes only one fuel injector 64 and swirler assembly 66, this is merely for illustration purposes and any number of fuel injectors 64 and swirler assemblies 66 may extend through the bulkhead 60.

The combustor 34 may also have an ignition system 67. The ignition system may have an igniter 68 that is operatively associated with the combustor 34. More specifically, the igniter 68 may be positioned downstream of the fuel injector 62 to ignite the swirling combustion air 36 and fuel 40 mixture in the combustion chamber 54. As shown in FIG. 2, the igniter 68 is a distributed spark igniter having a housing 69 with a terminal 70 projecting from the housing and into the combustion chamber 54. The igniter 68 may receive a flow of electricity by any known means in the art such as, but not limited to, an exciter 69 and a wiring harness 71 combination. As is known in the art, the exciter 69 generates electricity which is then transferred via the wiring harness 71 to the igniter 68.

The ignition system 67 may further include an electrode 72 also operatively associated with the combustor 34, and which is spaced apart from the igniter 68. More specifically, for the embodiment presented in FIG. 2, the igniter 68 and the electrode 72 may be positioned so as to be substantially diametrically opposed around the combustor 34. However, the electrode 72 may alternatively be positioned such that it is spaced from the igniter 68 at any desired point in the combustor 34, as long as there is an electrical potential created therebetween. However, by selectively positioning the igniter 68 and the electrode 72, this allows tailoring of a desired ignition area in the combustion chamber 54, as detailed further below.

Figure 3:
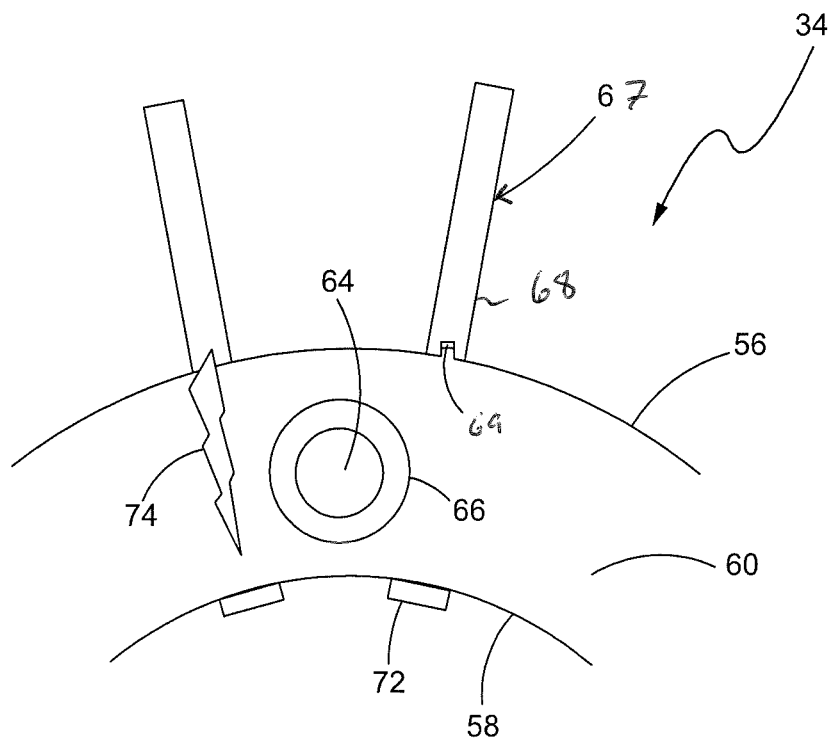
FIG. 3 is a fragmentary, lateral cross-sectional view of an annular combustor built in accordance with another embodiment of the present disclosure.

The igniter 68 may include the terminal 70 projecting from the igniter 68 into the combustion chamber 54 as shown in FIG. 2, but alternatively, the igniter may include a housing 73 with the electrode 70 being recessed into the housing 73 as shown in FIG. 3. The housing 73 may be made of a thermally and/or electrically insulating material. The thermally insulating material protects the terminal 70 from high temperatures in the combustion chamber 54, while the electrically insulating material protects the igniter 68 from electrical damage from the terminal 70.

The igniter 68 and the electrode 72 are provided with electrical characteristics such that an electrical potential is created therebetween. More specifically, the terminal 70 is a charged electrode that releases spark energy into the combustion chamber 54. The electrode 72 attracts that spark energy by providing a path of least resistance for the spark energy released by the terminal 70. In so doing, an electrical arc 74 is created between the terminals 70, and the electrode 72. In this manner, the electrode 72 receives the electrical arc 74 and protects the inner liner 58 from damage.

The electrode 72 may be a non-charged conductive rod or a charged electrode. In the case of a charged electrode, the electrode 72 will hold an opposite electrical charge than that of the terminal 70 and may have a lower energy than the first terminal 70. An electrical potential is thereby created between the terminal 70 and the electrode 72 which attracts the spark energy released by the terminal 70, creating the electrical arc 74. With the non-charged conductive rod embodiment, on the other hand, the non-charged conductive rod behaves similar to a lightning rod in that it presents a path with less resistance than the liners 56, 58 for the spark energy to travel along to a ground (not shown) or other dump for the electrical energy carried by the electrical arc 74. While the above embodiment describes the electrode 72 as extending through the inner shell 52 and liner 58, the electrode 72 may alternatively extend through the bulkhead 60 or the outer shell 50 and liner 56. In addition, more than one electrode 72 may be provided for every terminal 70. The additional and alternate positioning of the electrodes 72 allows for the path of the electrical arc 74 to be tailored for the air-fuel distribution in the combustion chamber 54, which in turn allows for more efficient burning of the air-fuel mixture and equates to reduced fuel consumption.

Figure 4:
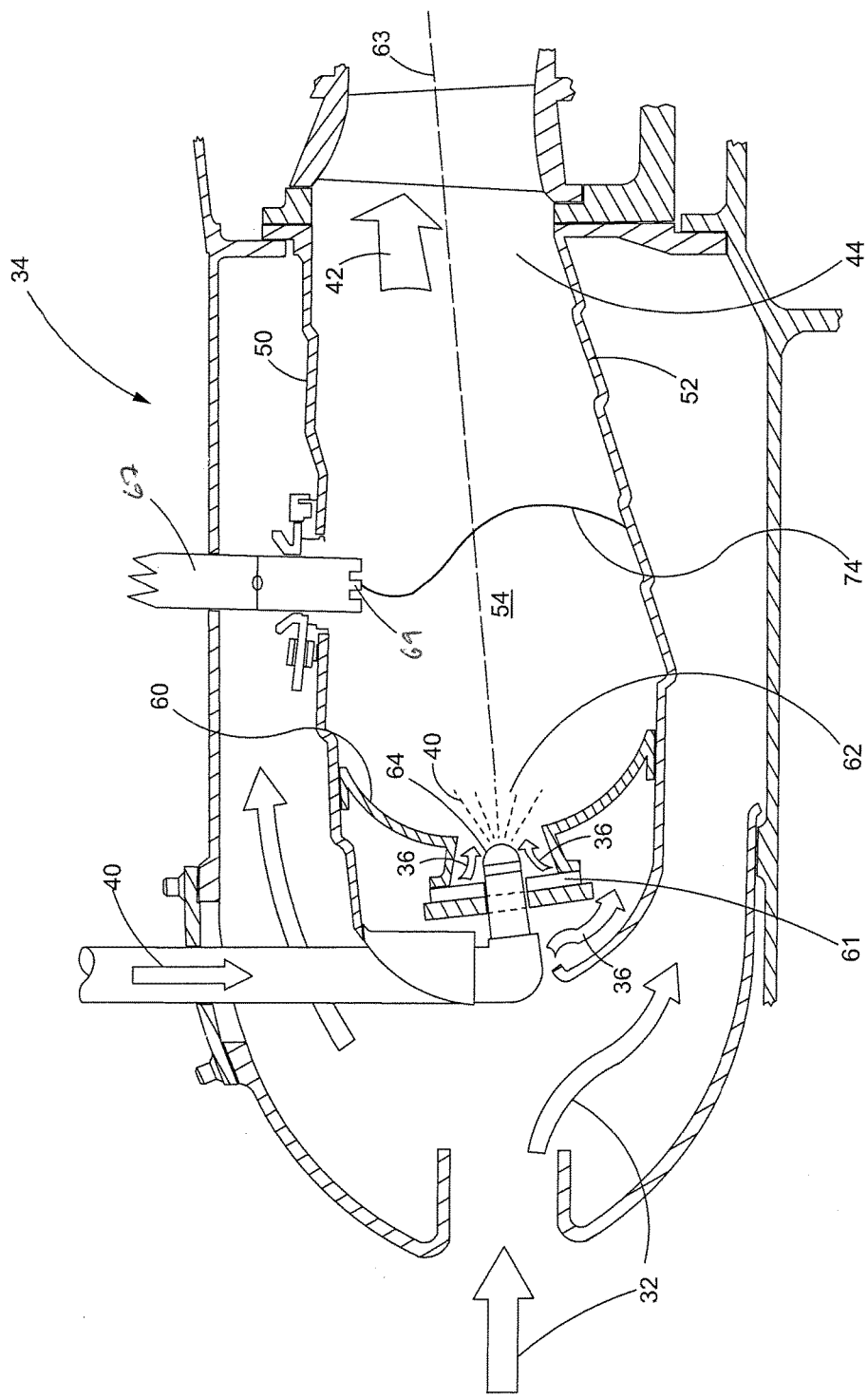
FIG. 4 is a longitudinal cross-sectional view of another annular combustor built in accordance with yet another embodiment of the present disclosure and detailing a distributed spark igniter having only one spark terminal.

In the foregoing embodiment, the electrode 72 is provided as a discrete element, separate from and mounted to one of the shell, liner or bulkhead. However, in the alternative embodiment shown in FIG. 4, the inner shell 52 may incorporate electrically-conductive materials. Such a configuration allows the inner shell to serve as the electrode 72. In other words, the spark energy released by the terminal 70 arcs between the terminal 70 and the inner shell 52 (which acts as the electrode 72 in this embodiment) thereby creating the electrical arc 74 between the terminal 70 and the inner shell 52. In this configuration, there are no liners 56, 58, but only shells 50, 52, as the liners 56, 58 may hinder and/or be damaged by the electrical arc 74. Other similar configurations allow for the electrically-conductive materials to be incorporated into other selected areas of the shells 50, 52, the bulkhead 60, the swirler assembly 66, the fuel injector 64, or other combustor elements. Such configurations allow the electrical arc 74 to ignite the air-fuel mixture as stated above and also allow the path of the electrical arc 74 to be tailored for the air-fuel distribution in the combustion chamber 54. These configurations also allow for more efficient burning of the air-fuel mixture or a reduction in the flow of fuel 40 into the combustion chamber 54.

While the presented embodiments describe the terminal 70 extending through the outer shell 50 and liner 56, other configurations are possible. One such alternate configuration may have the terminal 70 extending into the combustor 34 through the bulkhead 60. Another configuration may have the terminal 70 extending into the combustor 34 through the inner shell 52 and liner 58. These and other locations of the terminal 70 do not limit the possible locations of the electrode 72 or the incorporation of electrically conductive materials into elements of the combustor 34. Moreover, it is envisioned that any of the locations presented herein may be combined to tailor the ignition area of the combustion chamber 54.

In operation, the swirler assembly 66 may admit the combustion air 36 to mix with the fuel 40 from the fuel injector 64. The resultant air-fuel mixture is then ignited by the electrical arc 74 created between the terminal 70 and the electrode 74. Because the electrical arc 74 extends between the terminal 70 and the electrode 74, the air-fuel mixture along this path may be ignited, as opposed to prior art igniters where only the air-fuel mixture near the igniter 68 is ignited. This concentration of the initial flame by prior art igniters may leave the combustion chamber 54 thermally off balance by creating higher temperatures near the outer shell 50 than near the inner shell 52. However, the increased ignition area provided by the presented igniter 68 creates a more even burn throughout the combustion chamber 54 as the initial flame may be created through the combustion chamber 54 between the inner and outer shells 50 and 52. Additionally, the presented distributed spark igniter 68 may allow the air-fuel spread to be tailored to allow for a stronger flame along the centerline 36 of the combustion chamber 54. Such a flame reduces the temperatures in the combustion chamber 54 near to the liners 56, 58, which reduces thermal stresses on the igniter 68 and combustor 34, extending the life of the igniter 68, combustor 34, and engine 20.

It is envisioned that the presented igniter 68 will operate throughout the operation of the engine 68, from first ignition to shut-off. In such an operation, the igniter 68 may be operated to create a constant frequency-pulsed electrical arc 74 that will decrease the energy requirement needed to operate the igniter 68 as opposed to a constant electrical arc 74. Alternatively, the igniter 68 may also be operated to create a non-constant frequency-pulsed electrical arc 74. Such a non-constant frequency-pulse may be created by firing of the igniter 68 intermittently only at specified instances such as, but not limited to, low temperature in the combustor 34 or during a flame blow out.

INDUSTRIAL APPLICABILITY

From the foregoing, it can be seen that the distributed spark igniter disclosed herein has industrial applicability in a variety of settings such as, but not limited to, igniting an air-fuel mixture in a combustion chamber of a gas turbine engine. The gas turbine engine may be utilized in conjunction with an aircraft for generating power or thrust or in land-based systems for generating power. Using the teachings of the present disclosure, a distributed spark igniter may be constructed to create an electrical arc in a combustion chamber. Such an igniter may increase the area of the initial flame over prior art igniters, which may reduce thermal stress on the combustor as well as allow for tailoring of the air-fuel mixture and the combustion emissions.

While the present disclosure has been in reference to a gas turbine engine and an aircraft, one skilled in the art will understand that the teachings herein can be used in other applications as well such as, but not limited to, burners, augmentors, or any combustion device. It is therefore intended that the scope of the invention not be limited by the embodiments presented herein as the best mode for carrying out the invention, but that the invention will include all embodiments and equivalents falling within the spirit and scope of the appended claims as well.

What is claimed is:

1. An ignition system for a combustor, comprising:
   an igniter operatively associated with the combustor, wherein the combustor is annular in shape having an outer shell and an inner shell radially inward of the outer shell, wherein a combustion chamber is located between the inner shell and the outer shell; and
   an electrode operatively associated with the combustor and spaced from the igniter, wherein an electrical potential is created between the igniter and the electrode to produce an electric arc therebetween, wherein the electric arc stretches across an entire flowpath of the combustor from the outer shell to the inner shell.

2. The ignition system of claim 1, wherein the igniter includes a terminal which projects into the combustion chamber.

3. The ignition system of claim 1, wherein the igniter includes a housing and a terminal, wherein the terminal is recessed into the housing.

4. The ignition system of claim 3, wherein the housing is made of electrically insulating material.

5. The ignition system of claim 1, wherein the igniter and the electrode are diametrically opposed around the combustor.

6. The ignition system of claim 1, wherein the electrode is a discrete element separate from, and mounted to, at least one of the outer shell and the inner shell.

7. The ignition system of claim 1, wherein at least one of the outer shell and the inner shell serves as the electrode.

8. A gas turbine engine comprising:
   a compressor:
   a combustor downstream of the compressor, wherein the combustor is annular in shape having an outer shell and an inner shell radially inward of the outer shell, wherein a combustion chamber is located between the inner shell and the outer shell;
   an ignition system having an igniter operatively associated with the combustor, and an electrode operatively associated with the combustor and spaced from the igniter, wherein an electrical potential is created between the igniter and the electrode to produce an electric arc therebetween, wherein the electric arc stretches across an entire flowpath of the combustor from the outer shell to the inner shell; and
   a turbine downstream of the combustor and connected to the compressor by an engine shaft.

9. The gas turbine engine of claim 8, wherein the combustor includes a bulkhead, wherein the inner shell, the outer shell, and the bulkhead define the combustion chamber, and the igniter includes a terminal which projects into the combustion chamber.

10. The gas turbine engine of claim 8, wherein the igniter includes a housing and a terminal, wherein the terminal is recessed into the housing.

11. The gas turbine engine of claim 10, wherein the housing is made of electrically insulating material.

12. The gas turbine engine of claim 8, wherein the electrode is a discrete element separate from, and mounted to, at least one of the outer shell the inner shell.

13. The gas turbine engine of claim 8, wherein the electrode is a discrete element separate from, and mounted to, at least one of the outer shell and the inner shell.

14. The gas turbine engine of claim 8, wherein at least one of the outer shell and the inner shell serves as the electrode.

15. The gas turbine engine of claim 8, wherein the electrode is charged.

16. The gas turbine engine of claim 8, wherein the electrode is a non-charged electrically conductive rod.

17. A method of igniting a fuel and air mixture within a combustor, comprising;
   combining fuel with air in the combustor, wherein the combustor is annular in shape having an outer shell and an inner shell radially inward of the outer shell, wherein a combustion chamber is located between the inner shell and the outer shell;
   creating an electrical potential between an igniter and an electrode spaced apart from each other in the combustor and thereby producing an electric arc between the igniter and the electrode;
   igniting the fuel and air mixture with the electrical arc, wherein the electric arc stretches across an entire flowpath of the combustor from the outer shell to the inner shell.

18. The method of claim 17, wherein the producing the electrical arc involves creating a pulsed electrical arc between the igniter and the electrode.

19. The method of claim 18, wherein the producing the pulsed electrical arc involves creating a constant, frequency-pulsed electrical arc.

20. The method of claim 18, wherein the producing the pulsed electrical arc involves creating a non-constant, frequency-pulsed electrical arc.

* * * * *